United States Patent [19]

Konno et al.

[11] Patent Number: 5,089,732
[45] Date of Patent: Feb. 18, 1992

[54] SPINDLE MOTOR

[75] Inventors: Daisuke Konno, Kanagawa; Sachihiko Miwa, Saitama; Shunichi Aiyoshizawa, Tokyo; Kazuyuki Kasahara, Kanagawa; Yoshio Sato, Kanagawa; Kazuto Hirokawa, Kanagawa, all of Japan

[73] Assignee: Ebara Corporation, Tokyo, Japan

[21] Appl. No.: 556,255

[22] Filed: Jul. 19, 1990

[30] Foreign Application Priority Data

Jul. 24, 1989 [JP] Japan .................. 1-190883

[51] Int. Cl.⁵ .................. H02K 5/167; F16C 35/10
[52] U.S. Cl. .................. 310/67 R; 310/90; 310/51; 384/107
[58] Field of Search .......... 310/67 R, 90–90.5, 310/51, 52, 156; 384/124, 100, 107, 112; 360/98.06, 98.07, 99.04, 98.02

[56] References Cited

U.S. PATENT DOCUMENTS

| | | | |
|---|---|---|---|
| 4,515,486 | 5/1985 | Ide | 384/124 |
| 4,553,183 | 11/1985 | Brown et al. | 360/97.02 |
| 4,599,664 | 7/1986 | Schuh | 360/97 |
| 4,645,960 | 2/1987 | Hoffman | 310/90.5 |
| 4,652,149 | 3/1987 | Nakaoka et al. | 384/100 |
| 4,656,545 | 4/1987 | Kakuta | 360/98 |
| 4,698,542 | 10/1987 | Muller | 310/67 R |
| 4,922,406 | 5/1990 | Schuh | 360/97.03 |
| 4,998,033 | 3/1991 | Hisabe et al. | 310/67 R |
| 5,012,359 | 4/1991 | Kohno et al. | 360/98.07 |

FOREIGN PATENT DOCUMENTS

| | | |
|---|---|---|
| 206516 | 12/1986 | European Pat. Off. . |
| 2278128 | 2/1976 | France . |
| 55-088545 | 7/1980 | Japan . |
| 58-5518 | 1/1983 | Japan .................. 384/107 |
| 59-28757 | 2/1984 | Japan . |
| 61-112547 | 5/1986 | Japan . |
| 62-140271 | 6/1987 | Japan . |
| 63-87162 | 4/1988 | Japan . |
| 63-100416 | 5/1988 | Japan . |
| 63-241515 | 10/1988 | Japan . |
| 63-241516 | 10/1988 | Japan . |
| 63-241517 | 10/1988 | Japan . |

OTHER PUBLICATIONS

"Spiral Groove Ceramic Bearings and Their Application to Products" by Osada et al., Ebara Engineering Review, No. 143, Apr. 1989, pp. 16-20.

Journal of Japanese Society of Tribologists, Feb. 15, 1989, pp. 49-52.

Primary Examiner—Steven L. Stephan
Assistant Examiner—Edward To
Attorney, Agent, or Firm—Wenderoth, Lind & Ponack

[57] ABSTRACT

A spindle motor which is designed to rotate with minimal vibrations and hence is suitable for a hard disk driver. The spindle motor employs hydrodynamic bearings as radial and thrust bearings. A support shaft is formed in a cylindrical configuration with a center hole, and a rotor has a columnar portion which is inserted into the center hole in the support shaft. A thrust bearing collar is attached to the lower end of the rotor, and a thrust bearing member is secured to a base in opposing relation to the thrust bearing collar. A group of stator coils and a radial bearing member are disposed on either the inner peripheral surface of the center hole in the support shaft or the outer peripheral surface of the support shaft, and a group of rotor magnets and a radial bearing sleeve are disposed on either the outer peripheral surface of the columnar portion or the inner peripheral surface of the rotor in opposing relation to the stator coil group and the radial bearing member.

13 Claims, 4 Drawing Sheets

SPINDLE MOTOR

BACKGROUND OF THE INVENTION

The present invention relates to a spindle motor capable of rotating at high speed, which employs hydrodynamic bearings as radial and thrust bearings. More particularly, the present invention relates to a spindle motor which is designed to rotate with minimal vibrations irrespective of the position of the motor when used and hence is suitable for a hard disk driver (hereinafter referred to as simply "HDD").

With the development of HDDs with a high storage capacity and low power consumption, demand has been made for improvements in the performance of spindle motors which are used to drive them so that these spindle motors are even more suitable therefor.

FIG. 4 is a partially sectioned elevational view of a conventional spindle motor for an HDD. The spindle motor has a shaft support cylinder 22 in the center of a base 21. A group of stator coils 23 are secured to the outer periphery of the shaft support cylinder 22. A rotary shaft 25 is rotatably supported by the inner periphery of the shaft support cylinder 22 with ball bearings 24 interposed therebetween. The rotary shaft 25 has a support member 27 secured to the upper end thereof, the support member 27 being arranged such that hard disks are fixedly mounted on the outer peripheral surface thereof. The support member 27 has a group of rotor magnets 28 secured to the inner peripheral surface in opposing relation to the group of stator coils 23.

In the above-described spindle motor employing ball bearings, the level of vibration of the spindle motor depends on the internal clearances of the ball bearings. The level of vibration in the radial direction is substantially equal to the radial internal clearance of the ball bearings. Similarly, the level of vibration in the thrust direction is substantially equal to the internal clearance of the ball bearings. Measures have been taken to reduce the vibration caused by these internal clearances, for example, by preloading the ball bearings. However, no satisfactory level of vibration has heretofore been obtained, i.e., it has been only possible to achieve 0.5 microns or so in terms of the non-repeated component of the runout in the radial direction. In addition, preloading of ball bearings results in an increase in the required torque of the motor and hence is counterproductive to a desirous lowering of the power consumption of the HDD. Accordingly, as long as ball bearings such as those described above are used, it is in principle virtually impossible to further reduce vibrations of the spindle motor.

Under these circumstances, spindle motors which employ hydrodynamic bearings to achieve a highly accurate rotating performance have been proposed.

FIG. 5 is a sectional view of a spindle motor which employs hydrodynamic bearings, applied for which a patent was for in advance of this application, as U.S. patent application Ser. No. 07/506,183, filed Apr. 9, 1990 in the name of Hisabe et al. and assigned to the assignee of the present application, now U.S. Pat. No. 4,998,033. A base 31 has a support shaft 32 positioned on the central portion thereof. An annular thrust bearing member 33 is secured to the base 31, and a cylindrical radial bearing member 34 is concentrically secured to the support shaft 32. A plurality of equally spaced stator coils 35 are secured to the support shaft 32 above the cylindrical radial bearing member 34.

A rotor 36 which serves as a hard disk supporting member has a cap-shaped configuration. The ceiling portion at the upper end of the rotor 36 is loosely fitted on the upper end portion of the support shaft 32. The rotor 36 has an annular bearing member 37 secured to the lower end portion thereof, the bearing member 37 having an L-shaped cross-sectional configuration. The lower end portion of the bearing member 37 faces the thrust bearing member 33 to form a thrust hydrodynamic bearing having spiral grooves. The inner peripheral surface of the bearing member 37 faces the radial bearing member 34 to form a radial hydrodynamic bearing having herringbone-shaped grooves. A plurality of equally spaced rotor magnets 38 are secured to the inner periphery of the rotor 36 in opposing relation to the stator coils 35.

As the stator coils 35 are sequentially supplied with an electric current, the rotor 36 having the rotor magnets 38 begins to rotate and consequently pneumatic pressure is generated between the upper surface of the thrust bearing member 33 and the lower surface of the bearing member 37, thus forming a thrust hydrodynamic bearing. Similarly, pneumatic pressure is generated between the outer peripheral surface of the radial bearing member 34 and the inner peripheral surface of the bearing member 37, thus forming a radial hydrodynamic bearing. Since the bearing member 37 is supported without being in solid contact with the associated members, the spindle motor is capable of smoothly rotating at high speed. Accordingly, this spindle motor is free from the problem of friction and vibration in contrast to the prior art that employs ball bearings.

However, the above-described spindle motor still suffers from the problem that, when it is operated in a horizontal position (i.e., in a direction in which the direction of gravity is perpendicular to the shaft of the motor), a moment in the radial direction is generated due to the gravity of the rotor, causing the axis of the rotor to be inclined with respect to the support shaft, which results in an increase in the imbalance of radial magnetic force acting between the rotor magnets and the stator coils, and in this state the rotor is brought into local contact with the bearing.

In addition to the problem stated above, when the conventional spindle motors that employ hydrodynamic bearings are used in a horizontal position, the following problems are experienced:

(1) The level of vibration during rotation is large.

(2) When two discrete bearings are used, it is difficult to align them concentrically at the time of assembly. In addition, since the clearance between a movable piece and a fixed piece of a radial bearing is of the order of microns, it is difficult to align them concentrically during the manufacturing process. In addition, since the thrust collar of a thrust bearing is produced so that the parallelism is within several microns, it is necessary to hold down the parallelism to about 1 micron when it is assembled, which is very difficult.

(3) In a radial gap type spindle motor such as that shown in FIG. 5, a moment is generated due to the imbalance of radial magnetic force acting between the rotor magnet group and the stator coil group, causing the axis of the rotor to be inclined with respect to the support shaft, which results in an increase in the starting torque because of local contact of the dynamic pressure surfaces. In rotation, unstable radial magnetic force, which is added to the dynamic pressure, causes whirling of the shaft and therefore makes it impossible to obtain a satisfactory operating condition.

In view of the above-described circumstances, it is an object of the present invention to provide a spindle motor which employs hydrodynamic bearings to improve a high-speed rotating performance and minimize vibration irrespective of the position of the motor when used and which is therefore suitable for a high-recording capacity HDD.

SUMMARY OF THE INVENTION

To attain the above-described object, the present invention provides a spindle motor comprising: a cylindrical support shaft which is disposed in the center of a base; a cap-shaped rotor having in the center a columnar member which is inserted into a center hole in the cylindrical support shaft; either a group of rotor magnets or a group of rotor cores which are provided on the outer peripheral surface of the columnar member of the rotor; a group of stator coils which are provided on the inner peripheral surface of the center hole in the cylindrical support shaft in opposing relation to the group of rotor magnets or rotor cores; a radial hydrodynamic bearing for supporting the rotor, which has a radial bearing sleeve that is concentrically and integrally provided on the inner peripheral surface of the rotor and a radial bearing member that is concentrically and integrally provided on the outer peripheral surface of the cylindrical support shaft in opposing relation to the radial bearing sleeve; and a thrust hydrodynamic bearing for supporting a cap-shaped collar portion of the rotor on the base, which has a thrust bearing collar that is provided on the lower end of the cap-shaped collar portion and a thrust bearing member that is provided on the base in opposing relation to the thrust bearing collar.

In addition, the present invention provides a spindle motor comprising: a cylindrical support shaft which is disposed in the center of a base; a cap-shaped rotor having in the center a columnar member which is inserted into a center hole in the cylindrical support shaft; either a group of rotor magnets or a group of rotor cores which are provided on the inner peripheral surface of the rotor; a group of stator coils which are provided on the outer peripheral surface of the cylindrical support shaft in opposing relation to the group of rotor magnets or rotor cores; a radial hydrodynamic bearing for supporting the rotor, which has a radial bearing sleeve that is concentrically and integrally provided on the outer peripheral surface of the columnar member and a radial bearing member that is concentrically and integrally provided on the inner peripheral surface of the center hole in the cylindrical support shaft in opposing relation to the radial bearing sleeve; and a thrust hydrodynamic bearing for supporting a cap-shaped collar portion of the rotor on the base, which has a thrust bearing collar that is provided on the lower end of the cap-shaped collar portion and a thrust bearing member that is provided on the base in opposing relation to the thrust bearing collar.

The thrust bearing is preloaded by a magnetic force acting counter to a dynamic pressure that acts in the direction of thrust.

The longitudinal magnetic center of the rotor magnet group is offset from the longitudinal magnetic center of the stator coil group by a predetermined distance in a direction opposite to the dynamic pressure generated by the thrust bearing, thereby preloading the thrust bearing in a counter direction to the dynamic pressure acting in the direction of thrust.

At least one of the radial bearing, the thrust bearing and the support shaft is formed from a ceramic material, for example, silicon carbide, alumina, etc.

The radial bearing is disposed so as to bear the rotor over a certain range including the center of gravity of the rotor.

A resilient pad, which is made, for example, of silicone rubber, is interposed between the thrust bearing member and the base.

Some or all of the radial bearing sleeve, the rotor, the columnar member and the thrust bearing collar may be provided as part of an integral structure. Either one or both of the radial bearing sleeve and the thrust bearing collar, which are integral with each other, may be coated with a material which is different from a base material therefor, or may have the base material subjected to a surface treatment.

Further, some or all of the radial bearing member, the support shaft, the base and the thrust bearing member may be provided as part of an integral structure. Either one or both of the radial bearing member and the thrust bearing member, which are integral with each other, may be coated with a material which is different from a base material therefor, or may have the base material subjected to a surface treatment.

By virtue of the above-described arrangement of the spindle motor, the rotor is supported by the support shaft through the radial bearing that is concentric and integral with the support shaft, and the cap-shaped collar portion of the rotor is supported by the base through the thrust bearing. The spindle motor is therefore capable of operating with sufficient load carrying capacity. Accordingly, the dynamic pressure increases and the radial vibration is minimized. Further, since the radial hydrodynamic bearing is not formed in a cantilever structure, the starting torque is minimized Since the respective centers of the stator and the radial bearings are made closely adjacent with each other, it is possible to eliminate the imbalance of magnetic force between the stator coil group and the rotor magnet group due to the radial moment and hence minimize vibration during rotation.

Since the thrust bearing is disposed at the outer periphery (collar portion) of the rotor, it is possible to increase both the diameter and area of the thrust bearing and hence obtain a high dynamic pressure. In addition, by magnetically preloading the thrust bearing in the thrust direction, the inclination of the support shaft with respect to the radial bearing is corrected and the rotor is capable of stably rotating without being sprung out by the dynamic pressure applied thereto in the thrust direction. In particular, even when the spindle motor is used in a horizontal position, the rotor rotates stably. In addition, it is possible to avoid an increase in the starting torque which would otherwise be caused by local contact in a cantilever structure.

It should be noted that "the center of gravity of the rotor" in the statement to the effect that the radial bearing is disposed so as to support the rotor over a certain range including the center of gravity of the rotor, means the center of gravity of the rotor that includes the load of hard disks (HD), for example, which are attached thereto.

Since the thrust bearing can be readily preloaded by offsetting the longitudinal magnet center of the rotor magnet group from the longitudinal magnet center of the stator coil group by a predetermined distance in a counter direction to the dynamic pressure generated from the thrust bearing, no particular preloading means is needed.

Since the clearance between the movable and fixed pieces of each of the thrust and radial bearings in the above-described spindle motor has a small value on the order of microns, the thrust bearing is preferably disposed exactly at right angles with respect to the radial bearing. It is, however, difficult to dispose it exactly at right angles because of the limitation on the degree of accuracy with which the bearings are produced. In the spindle motor of the present invention, however, a resilient pad, for example, silicone rubber, which is interposed between the thrust bearing and the base effectively absorbs any error in the perpendicular alignment thereof.

DETAILED DESCRIPTION OF THE PREFERRED EMBODIMENTS

One embodiment of the present invention will be described below with reference to the accompanying drawings.

Figure 1:
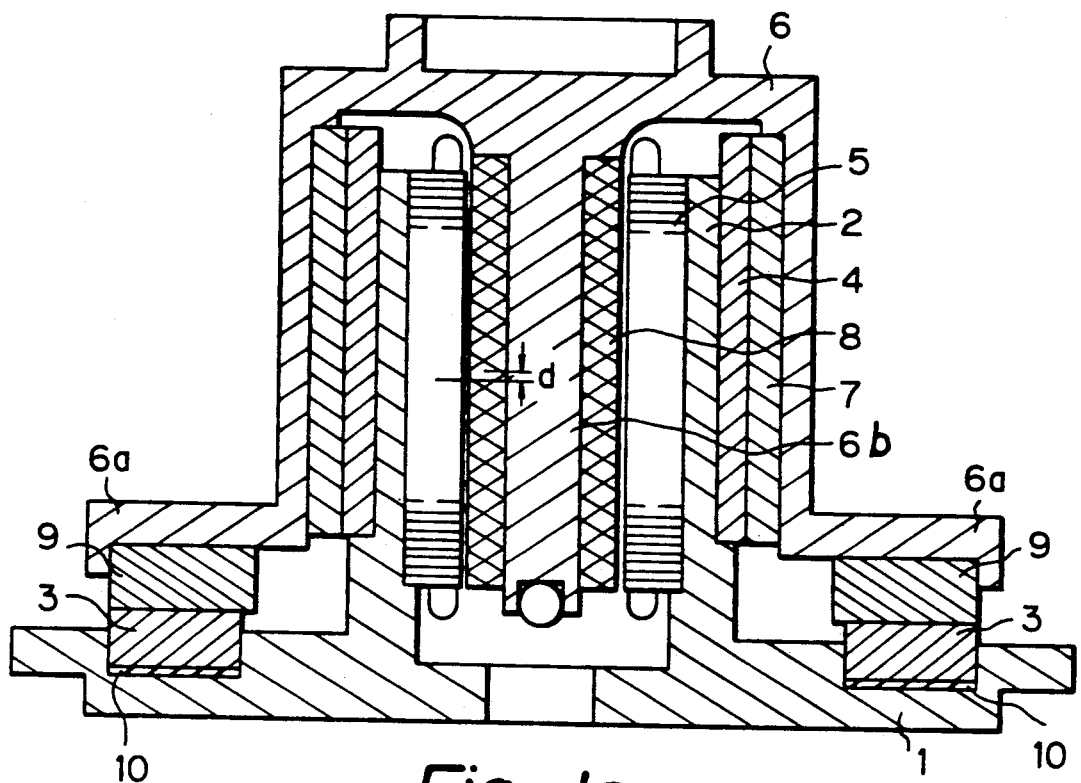
FIG. 1 is a sectional view showing the structure of one embodiment of the spindle motor according to the present invention.

FIG. 1 is a sectional view showing the structure of one embodiment of the spindle motor according to the present invention. In the figure, reference numeral 1 denotes a base, which has a cylindrical support shaft 2 positioned on the central portion thereof. A stator coil group 5 is secured to the inner peripheral surface of a center hole in the support shaft 2. Reference numeral 6 denotes a cap-shaped rotor, which has in the center a columnar member 6b which is inserted into the center of the stator coil group 5. A cylindrical rotor magnet group 8 is secured to the outer periphery of the columnar member 6b in opposing relation to the stator coil group 5. The rotor 6 has at the lower end a collar portion 6a which extends horizontally. A thrust bearing collar 9 is secured to the bottom of the collar portion 6a. A thrust bearing member 3 is provided on the base 1 in opposing relation to the thrust bearing collar 9. A radial bearing member 4 is provided on the outer periphery of the support shaft 2, and a radial bearing sleeve 7 is provided on the inner peripheral surface of the rotor 6 in opposing relation to the radial bearing member 4.

The longitudinal magnetic center of the rotor magnet group 8 is offset a predetermined distance d upwardly from the longitudinal magnetic center of the stator coil group 5 that is provided on the inner periphery of the support shaft 2. More specifically, the longitudinal magnetic center 8a of the rotor magnetic group 8 is offset from the longitudinal magnetic center 5a of the stator coil group 5 a predetermined distance d in a direction away from the thrust bearing member 3. Thus, the rotor 6 is pressed against the thrust bearing member 3 with a predetermined level of magnetic force acting between the rotor magnet group 8 and the stator coil group 5. That is, by upwardly offsetting the longitudinal magnetic center of the rotor magnet group 8 from the longitudinal magnetic center of the stator coil group 5 by a predetermined distance, the thrust bearing member 3 is preloaded by the magnetic force in a counter direction to the dynamic pressure generated from the thrust bearing member 3. It should be noted that the rotor 6 is arranged such that hard disks can be mounted on the outer peripheral portion thereof.

The above-described spindle motor is a so-called radial gap type spindle motor, in which the stator coil group 5 and the rotor magnet group 8 comprise a driving part of the spindle motor.

Figure 2:
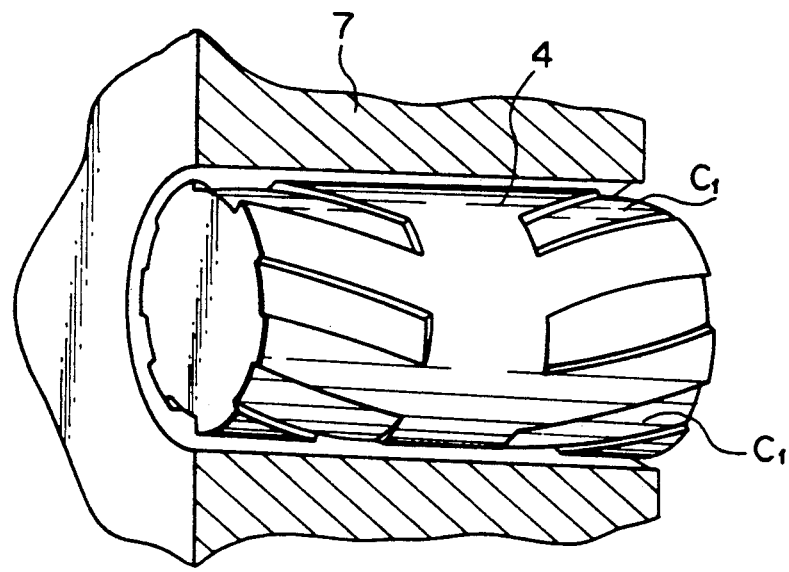
FIG. 2 schematically shows dynamic pressure generating grooves formed in a radial bearing member.
Figure 3:
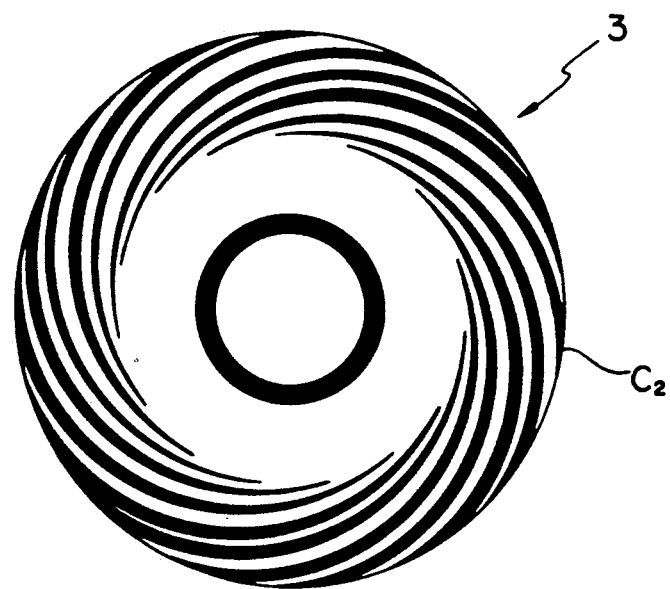
FIG. 3 schematically shows dynamic pressure generating grooves formed in a thrust bearing member.
Figure 4:
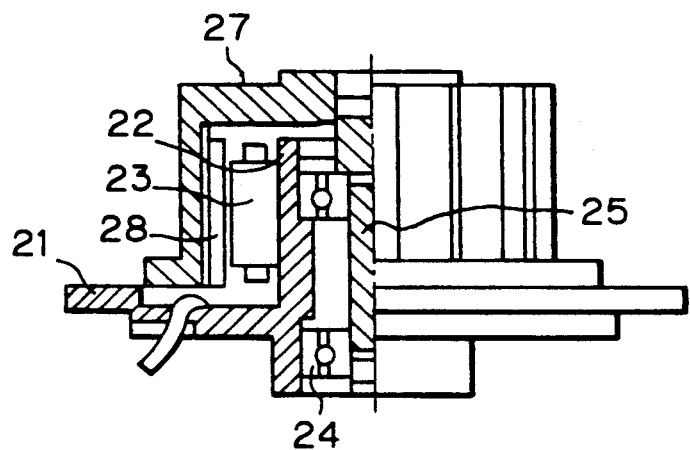
FIG. 4 is a partially sectioned elevational view of a conventional spindle motor for an HDD.
Figure 5:
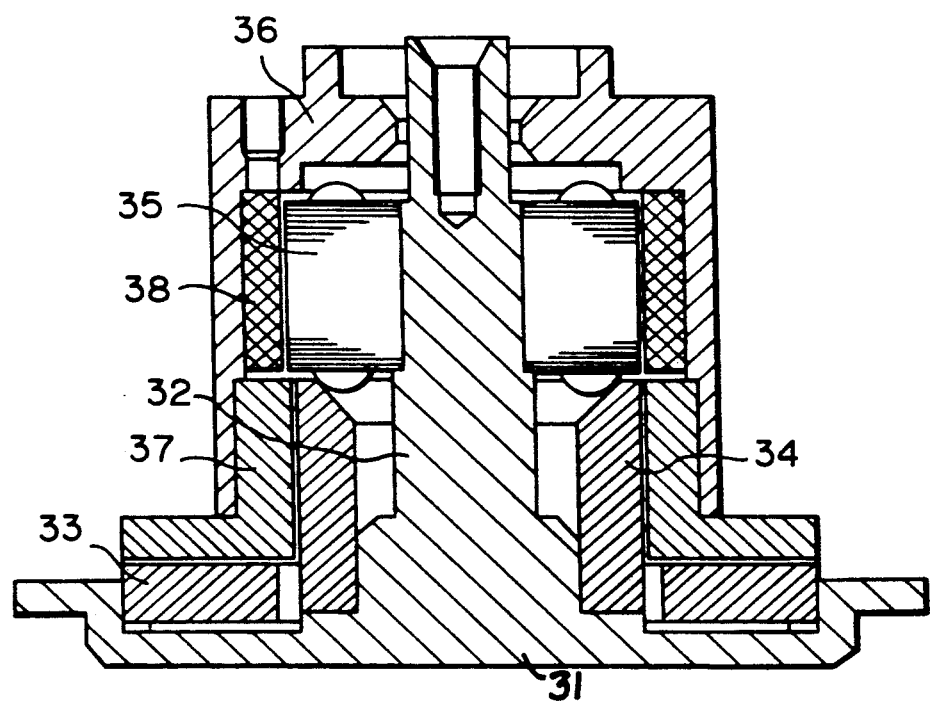
FIG. 5 is a sectional view of a spindle motor which employs hydrodynamic bearings, for which an application for a U.S. patent was filed in advance of this application by assignors to the assignee of the present application.

The surface of the radial bearing member 4 that faces the radial bearing sleeve 7 has herringbone-shaped grooves $C_1$ for generating dynamic pressure, such as those shown in FIG. 2, and the surface of the thrust bearing member 3 that faces the thrust bearing collar 9 has spiral grooves $C_2$ for generating dynamic pressure, such as those shown in FIG. 3.

In the spindle motor having the above-described arrangement, as the stator coils 5 are sequentially supplied with an electric current, the rotor 6 having the rotor magnet group 8 secured thereto begins to rotate and consequently a hydrodynamic pressure is generated between the upper surface of the thrust bearing member 3 and the lower surface of the thrust bearing collar 9, which are in opposing relation to each other, thus forming a hydrodynamic thrust bearing. Similarly, a hydrodynamic pressure is generated between the outer peripheral surface of the radial bearing member 4 and the inner peripheral surface of the radial bearing sleeve 7, which are in opposing relation to each other, thus forming a hydrodynamic radial bearing. Thus, the radial bearing sleeve 7 and the thrust bearing collar 9 are supported without being in solid contact with the radial bearing member 4 and the thrust bearing member 3. The spindle motor is therefore capable of smoothly rotating at high speed. Accordingly, the spindle motor of the present invention is free from the problem of friction and vibration in contrast to the prior art that employs ball bearings to support the rotor.

It should be noted that the surface of the radial bearing sleeve 7 that faces the radial bearing member 4 may be formed with dynamic pressure generating grooves, with the outer peripheral surface of the radial bearing member 4 being smooth, and the surface of the thrust bearing collar 9 that faces the thrust bearing member 3 may be formed with dynamic pressure generating grooves, with the upper surface of the thrust bearing member 3 being smooth.

Either one or both of the radial bearing member 4 and the radial bearing sleeve 7 may be omitted, and in such a case one of the opposing surfaces of the support shaft 2 and the radial bearing sleeve 7, one of the opposing surfaces of the radial bearing member 4 and the rotor 6 or one of the opposing surfaces of the support shaft 2 and the rotor 6 may be formed with dynamic pressure generating grooves, with the other surface being smooth. Similarly, either one or both of the thrust bearing member 3 and the thrust bearing collar 9 may be omitted, and in such a case one of the opposing surfaces of the thrust bearing member 3 and the collar portion 6a of the rotor 6, one of the opposing surfaces of the thrust bearing collar 9 and the base 1 or one of the collar portion 6a of the rotor 6 and the base 1 may be formed with dynamic pressure generating grooves, with the other surface being smooth. The radial bearing and the thrust bearing may be formed in an integral structure, as a matter of course.

By making the center of the radial bearing member 4 closely adjacent with the center of the stator coil group 5 that constitutes the stator, the imbalance of magnetic force between the stator and the rotor magnet group 8 due to the moment acting in the radial direction is substantially eliminated and the level of vibration during rotation is minimized.

By virtue of the above-described structure of the spindle motor, the radial hydrodynamic bearing that comprises the radial bearing member 4 and the radial bearing sleeve 7 is relatively long, that is, substantially the same as the height of the rotor 6. Accordingly, the effective working pressure range within which sufficient load carrying capacity is provided increases, and the radial vibration decreases. Since the radial hydrodynamic bearing is long, it is not formed in a cantilever structure and the starting torque is therefore minimized. Although in the above-described embodiment the length of the radial hydrodynamic bearing is substantially the same as the height of the rotor 6, it should be noted that the described arrangement is merely a preferred form and that the length of the radial hydrodynamic bearing may be smaller than the height of the rotor 6 depending on circumstances. However, if the center of gravity of the rotor 6 is, at least, within the effective working pressure range of the radial hydrodynamic bearing, local contact of the radial bearing can be avoided even when the motor is in an inoperative state, in which no preload is applied. When the load of hard disks, for example, is attached to the rotor 6, the center of gravity of the rotor 6 that includes this load should be taken into consideration with a view to achieving the above-described advantageous effect in a loaded state.

Since the radial hydrodynamic bearing is long and a large dynamic pressure is therefore generated, the radial bearing member 4 and the radial bearing sleeve 7 are not required to be machined to any particularly high degree of accuracy.

When the spindle motor that has the above-described structure is used in a vertical position, the range of preload applied in the thrust direction by the magnetic force from the rotor magnet group 8 depends on the dynamic pressure generated between the thrust bearing member 3 and the thrust bearing collar 9, the weight of the rotor 6 that is applied to the thrust bearing member 3 and the machining accuracy of the thrust bearing member 3 and the thrust bearing collar 9. However, it is, in effect, only necessary to satisfy the following relationship:

$$P < 100 \times S^2 - W \qquad (1)$$

wherein P: the preload in gms. applied by the rotor magnet group 8; S: the area in $cm^2$ of the thrust bearing; and W: the weight [g] of the rotor 6. In the above relationship, $100 \times S$ is the dynamic pressure in $g/cm^2$ required for the rotor to rotate without solid contact through a hydrodynamic bearing finished by an existing, economical finishing process.

When the spindle motor that has the above-described structure is used in a horizontal position, the weight of the rotor 6 is not applied to the thrust bearing member 3. Accordingly, if no preload is applied in the thrust direction by magnetic force, an inclination of the support shaft 2 with respect to the radial bearing causes local contact of the bearing members, or when the spindle motor is started, the rotor 6 is sprung out in the thrust direction and is therefore unable to rotate stably. It is therefore preferable to apply in advance a force to the thrust bearing member 3 in a counter direction to the dynamic pressure generated from the thrust bearing member 3, that is, to preload the thrust bearing member 3, by utilizing the rotor magnet group 8, which constitutes the driving part of the spindle motor.

In the above-described embodiment, since the thrust bearing member 3 is disposed below the collar portion 6a of the rotor 6, the diameter of the thrust bearing member 3 increases, and the rotor 6 is pulled by the above-described preload toward the thrust bearing member 3 having a relatively large diameter. Accordingly, the radial deflection of the rotor 6 decreases, and stable rotation of the rotor 6 is achieved. In addition, since the driving part that comprises the rotor magnet group 8 and the stator coil group 5 is sealed by the thrust bearing that comprises the thrust bearing collar 9 and the thrust bearing member 3, if the dynamic pressure generating grooves are formed so that the dynamic pressure generated will act inwardly, as shown in FIG. 3, the thrust bearing sucks in air from the outside and generates a dynamic pressure between the thrust bearing member 3 and the thrust bearing collar 9 by compression of the air. No air will therefore flow outward from the inside of the rotor 6 and no dust will be scattered outwardly from the rotor magnet group 8 and the stator coil group 5. Accordingly, the spindle motor of the present invention is suitable for use in an environment where dust must be kept out. In an environment where there is no particular need to exclude dust, the dynamic pressure generating grooves may be formed so that the dynamic pressure generated will act outwardly of the thrust bearing, as a matter of course.

In the spindle motor that is arranged as described above, the radial bearing member 4 and the radial bearing sleeve 7, which comprise a radial hydrodynamic bearing, and the thrust bearing member 3 and the thrust bearing collar 9, which comprise a thrust hydrodynamic bearing, rotate without contacting each other, through a fluid which is compressed during the rotation of the motor. Accordingly, these bearing members may be made of any kind of material as long as it can be machined with a high degree of accuracy. Any generally employed metallic materials and organic materials may be utilized. The point is that it is necessary to minimize the frictional resistance and wear of the bearing members at the time when the motor is started and rotating at low speed. The range of usable materials therefore depends upon the bearing structure adopted.

In this embodiment, the size of each of the radial bearing member 4 and the radial bearing sleeve 7, which comprise a radial hydrodynamic bearing, and the thrust bearing member 3 and the thrust bearing collar 9, which comprise a thrust hydrodynamic bearing, is increased to reduce the surface pressure acting on the contact surfaces and the stator coil group 5 is properly disposed to attain a structure which is free from any local contact. Accordingly, if the members that constitute the bearings are made of, for example, a stainless steel, and a thin coat of lubricant is applied to the contact surfaces, it is possible to maintain a stable performance for a long period of time. However, no or minimal lubricant can be used in certain environments where the spindle motor is used. In such a case, it is preferable to employ a material which is superior in wear-resistant and sliding properties, particularly a ceramic material. Silicon carbide or alumina is particularly suitable for such an application. The members that constitute radial and thrust bearings may be formed from a base material other than ceramic materials, which is coated with a thin film of a material which is different from the base material, or provided with a surface layer which is formed by changing the properties of the base material.

Figure 1A:
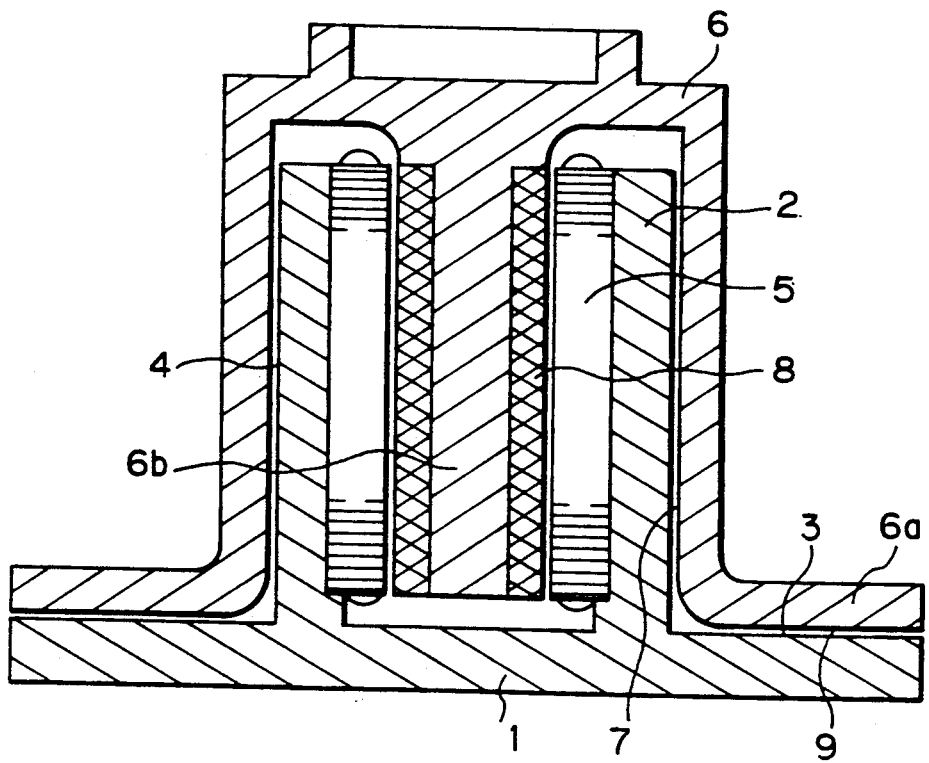
FIG. 1a is a sectional view, similar to FIG. 1, showing a modification of the spindle motor shown in FIG. 1.

FIG. 1a shows a modification of the spindle motor shown in FIG. 1. In the spindle motor that is shown in FIG. 1a, the radial bearing sleeve 7, the rotor 6, the columnar member 6a and the thrust bearing collar 9 are provided in an integral structure, and the radial bearing member 4, the support shaft 2, the base 1 and the thrust bearing member 3 are provided in an integral structure. Either one or both of the radial bearing member 4 and the radial bearing sleeve 7 are coated with a thin film of a material which is different from the base material, or provided with a surface layer which is formed by changing the properties of the base material. The thin film is produced, for example, by means of physical or chemical vapor deposition, or plating. The surface layer is produced, for example, by oxidation, nitriding, or ion implantation. Similarly, either one or both of the thrust bearing member 3 and the thrust bearing collar 9 are coated with a thin film of a material which is different from the base material, or provided with a surface layer which is formed by changing the properties of the base material. The structures of the other portions and members of this modification are the same as those of the spindle motor that is shown in FIG. 1.

Figure 6:
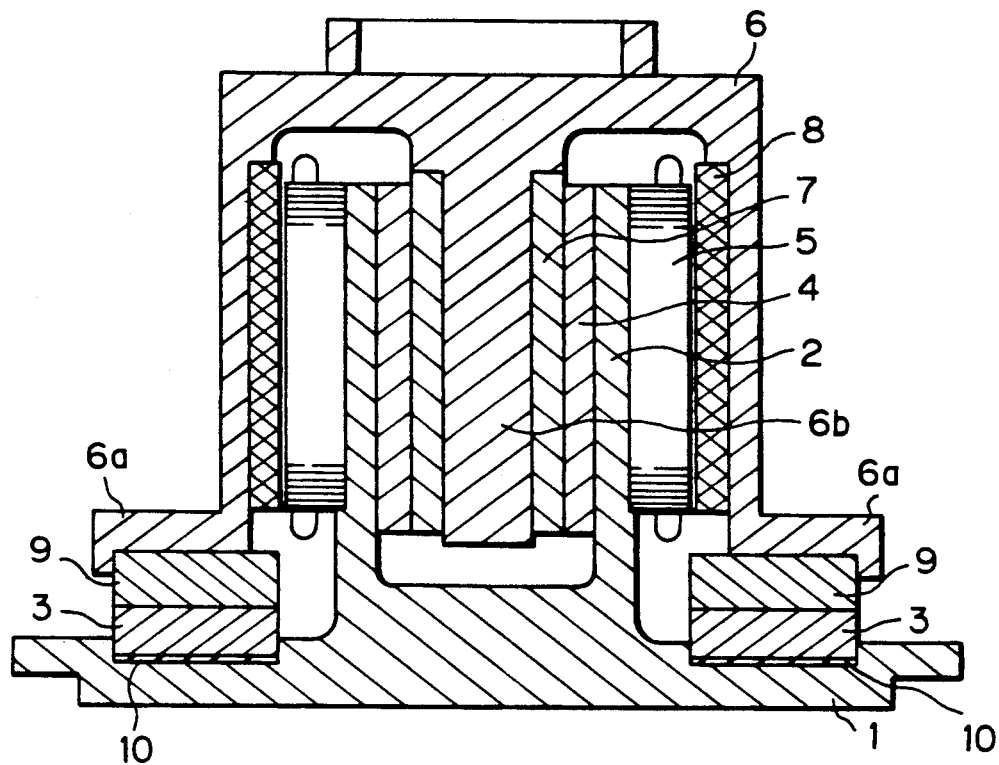
FIG. 6 is a sectional view of another embodiment of the spindle motor according to the present invention.

FIG. 6 is a sectional view showing the structure of another embodiment of the spindle motor according to the present invention. As will be clear from the illustration, in the spindle motor of this embodiment, the rotor magnet group 8 is provided on the inner peripheral surface of the rotor 6, and the stator coil group 5 is provided on the outer peripheral surface of the cylindrical support shaft 2 in opposing relation to the rotor magnet group 8. The radial bearing sleeve 7 is provided on the outer peripheral surface of the columnar member 6b of the rotor 6, and the radial bearing member 4 is provided on the inner peripheral surface of the center hole in the cylindrical support shaft 2 in opposing relation to the radial bearing sleeve 7. The radial bearing sleeve 7 and the radial bearing member 4 are concentric and integral with the columnar member 6b and the support shaft 2, respectively.

The thrust bearing collar 9 is provided on the cap-shaped collar portion 6a of the rotor 6 and the thrust bearing member 3 is provided on the base 1 at a position which faces the thrust bearing collar 9, in the same way as in the spindle motor shown in FIG. 1.

The spindle motor of the second embodiment that is shown in FIG. 6 is different from the spindle motor of the first embodiment shown in FIG. 1 in that, in the spindle motor of the second embodiment the stator coil group 5 and the rotor magnet group 8, which constitute a driving part of the motor, are disposed outside the radial bearing sleeve 7 and the radial bearing member 4, which constitute a radial bearing, whereas, in the spindle motor of the first embodiment the stator coil group 5 and the rotor magnet group 8 are disposed inside the radial bearing sleeve 7 and the radial bearing member 4. The other features and advantages of the two embodiments are substantially the same. It should be noted that, since in the spindle motors shown in FIGS. 1 and 6 the clearance between the movable and fixed pieces of each of the thrust and radial bearings has a small value on the order of microns, the thrust bearing 3 is preferably disposed exactly at right angles with respect to the radial bearing 4. It is, however, difficult to dispose it exactly at right angles because of the limitation on the degree of accuracy with which the bearings are produced. For this reason, a resilient pad 10, which is made, for example, of a silicone rubber material, is interposed between the thrust bearing member 3 and the base 1 to absorb any error in the perpendicularity.

Although both the spindle motors described above are so-called synchronous spindle motors in which the rotor magnet group 8 is provided on the rotor 6 and the stator coil group 5 is disposed on the support shaft 2 in opposing relation to the rotor magnet group 8, these motors may be made in the form of induction motors by replacing the rotor magnet group 8 with rotor cores.

Figure 6A:
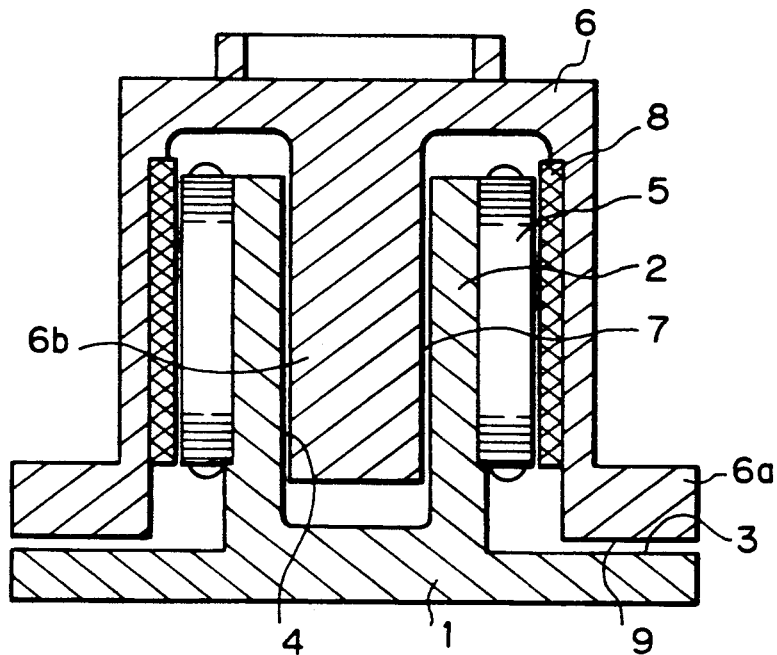
FIG. 6a is a sectional view, similar to FIG. 6, showing a modification of the spindle motor shown in FIG. 6.

FIG. 6a shows a modification of the spindle motor shown in FIG. 6. In the spindle motor that is shown in FIG. 6a, the radial bearing sleeve 7, the columnar member 6a, the rotor 6 and the thrust bearing collar 9 are arranged in an integral structure, and the radial bearing member 4, the support shaft 2, the base 1 and the thrust bearing member 3 are arranged in an integral structure. Either one or both of the radial bearing member 4 and the radial bearing sleeve 7 are coated with a thin film of a material which is different from the base material, or provided with a surface layer which is formed by changing the properties of the base material. The thin film is produced, for example, by means of physical or chemical vapor deposition, or plating. The surface layer is produced, for example, by oxidation, nitriding, or ion implantation. Similarly, either one or both of the thrust bearing member 3 and the thrust bearing collar 9 are coated with a thin film of a material which is different from the base material, or provided with a surface layer which is formed by changing the properties of the base material. The structures of the other portions and members of this modification are the same as those of the spindle motor that is shown in FIG. 6.

As has been described above, the present invention provides the following advantageous effects:

(1) Since the constituent members of the radial bearing are integral with the associated constituent members of the spindle motor, alignment effected at the time of assembly is facilitated. In addition, it is easy to carry out precise machining of the radial bearing itself.

(2) Since the radial bearing is arranged to support the rotor over a predetermined range which includes at least the center of gravity of the rotor, the spindle motor is capable of operating with sufficient load carrying capacity. Accordingly, the dynamic pressure increases and the radial vibration is minimized. Since the radial bearing is relatively long, it is not formed in a cantilever structure and the starting torque is therefore minimized. In addition, since the constituent members of the radial bearing are not required to be machined to any particularly high degree of accuracy, the production cost is lowered.

(3) By disposing the thrust bearing at the outer periphery of the rotor, it is possible to increase both the diameter and area of the thrust bearing and hence obtain a high dynamic pressure. In addition, by magnetically preloading the thrust bearing in the thrust direction, the inclination of the support shaft with respect to the radial bearing is corrected and the rotor is capable of stably rotating without being sprung out by the dynamic pressure applied thereto in the thrust direction. In particular, even when the spindle motor is used in a horizontal position, the rotor rotates stably by virtue of the cooperation of the elongated radial bearing and the preload applied to the thrust bearing.

(4) By virtue of the spindle motor structure according to the present invention, the axial position of the motor driving part, which comprise a stator coil group and a rotor magnet group or a rotor core group, can be made substantially coincident with the axial position of the radial bearing. It is therefore possible to eliminate the imbalance of magnetic force between the stator coil group and the rotor magnet group or the rotor core group due to the radial moment and hence enable the motor to rotate with minimal vibrations.

(5) If the members that constitute thrust and radial bearings are formed from a ceramic material, e.g., silicon carbide or alumina, an oil free type or a minimal lubricant type spindle motor is obtained.

(6) By offsetting the longitudinal magnetic center 8a of the rotor magnetic group from the longitudinal magnetic center 5a of the stator coil group by a predetermined distance in a direction away from the thrust bearing, the thrust bearing can be readily preloaded by the magnetic force acting between the rotor magnet group and the stator coil group without any particular preloading means.

What is claimed is:

1. A spindle motor comprising:
a cylindrical support shaft having a center hole and which is disposed in the center of a base;
a cap-shaped rotor having in the center a columnar member which is inserted into said center hole in said cylindrical support shaft;
either a group of rotor magnets or a group of rotor cores which are provided on the outer peripheral surface of said columnar member of said rotor;
a group of stator coils which are provided on the inner peripheral surface of said center hole in said cylindrical support shaft in opposing relation to said group of rotor magnets or rotor cores;
a radial hydrodynamic bearing for supporting said rotor, which comprises a radial bearing sleeve that is concentrically and integrally provided on the inner peripheral surface of said rotor and a radial bearing member that is concentrically and integrally provided on the outer peripheral surface of said cylindrical support shaft in opposing relation to said radial bearing sleeve, the center, in the direction of the length of said support shaft, of said group of rotor magnets or rotor cores and the center of said group of stator coils and the center, in the direction of the length of said support shaft of said radial hydrodynamic bearing being closely adjacent; and
a thrust hydrodynamic bearing for supporting a cap-shaped collar portion of said rotor on said base, which comprises a thrust bearing collar that is provided on the lower end of said cap-shaped collar portion and having a flat face extending outwardly of the inner peripheral surface of said radial bearing sleeve a thrust bearing member that is provided on said base having a flat face in opposing relation to said thrust bearing collar, whereby said thrust hydrodynamic bearing can support a large load, and the parallelism between the faces of said bearing collar and thrust bearing member is easily maintained.

2. A spindle motor comprising:
a cylindrical support shaft having a center hole which is disposed in the center of a base;
a cap-shaped rotor having in the center a columnar member which is inserted into said center hole in said cylindrical support shaft;
either a group of rotor magnets or a group of rotor cores which are provided on the inner peripheral surface of said rotor;
a group of stator coils which are provided on the outer peripheral surface of said cylindrical support shaft in opposing relation to said group of rotor magnets or rotor cores;
a radial hydrodynamic bearing for supporting said rotor, which comprises a radial bearing sleeve that is concentrically and integrally provided on the outer peripheral surface of said columnar member and a radial bearing member that is concentrically and integrally provided on the inner peripheral surface of said center hole in said cylindrical support shaft in opposing relation to said radial bearing sleeve, the center, in the direction of the length of said support shaft, of said group of rotor magnets or rotor cores and the center of said group of stator coils and the center, in the direction of the length of said support shaft of said radial hydrodynamic bearing being closely adjacent; and
a thrust hydrodynamic bearing for supporting a cap-shaped collar portion of said rotor on said base, which comprises a thrust bearing collar that is provided on the lower end of said cap-shaped collar portion and extending outwardly of said radial bearing member and a thrust bearing member that is provided on said base in opposing relation to said thrust bearing collar, whereby said thrust hydrodynamic bearing can support a large load, and the parallelism between the faces of said bearing collar and said thrust bearing member is easily maintained.

3. A spindle motor according to claim 1 or 2, further comprising a magnetic force producing means for providing on said thrust bearing a preloading magnetic force acting counter to a dynamic pressure acting in the direction of thrust.

4. A spindle motor according to claim 3, wherein the longitudinal magnetic center of said rotor magnet group is offset from the longitudinal magnetic center of said stator coil group by a predetermined distance in a counter direction to the dynamic pressure generated from said thrust bearing for preloading said thrust bearing in a counter direction to the dynamic pressure acting in the direction of thrust.

5. A spindle motor according to claim 1 or 2, wherein at least either one of said radial and thrust bearings is formed from a material selected from among a ceramic material, a material compising a base material which is coated with a thin film of a material which is different from said base material, and a material comprising a base material which is provided with a surface layer formed by changing the properties of said base material.

6. A spindle motor according to claim 5, wherein said ceramic material is either silicon carbide or alumina.

7. A spindle motor according to claim 1 or 2, further comprising a resilient pad interposed between said thrust bearing and said base.

8. A spindle motor according to claim 7, wherein said resilient pad is silicone rubber.

9. A spindle motor according to claim 1 or 2, wherein some or all of said radial bearing sleeve, said rotor, said columnar member and said thrust bearing collar are in an integral structure.

10. A spindle motor according to claim 9, wherein either one or both of said radial bearing sleeve and said thrust bearing collar, which are integral with each other, are coated with a material which is different from a base material therefor, or have said base material subjected to a surface treatment.

11. A spindle motor according to claim 1 or 2, wherein some or all of said radial bearing member, said support shaft, said base and said thrust bearing member are in an integral structure.

12. A spindle motor according to claim 11, wherein either one or both of said radial bearing member and said thrust bearing member, which are integral with each other, are coated with a material which is different from a base material therefor, or have said base material subjected to a surface treatment.

13. A spindle motor according to claim 1 or 2, wherein said rotor has a support member adapted to hold hard disks on the outer peripheral surface thereof.

* * * * *